Patented May 5, 1964

3,132,176
PREPARATION OF O,O-DIALKANOYL DERIVATIVES OF D,L-α-ALKYL-β-3,4-DIHYDROXYPHENYLALANINE BY PREFERENTIAL ACYLATION
Frederick W. Bollinger, Westfield, and Donald F. Reinhold and Meyer Sletzinger, North Plainfield, N.J., assignors to Merck & Co., Inc., Rahway, N.J., a corporation of New Jersey
No Drawing. Filed Aug. 19, 1960, Ser. No. 50,574
1 Claim. (Cl. 260—479)

This invention relates to new antihypertensive agents and intermediates for hypertensive agents. More specifically, this invention relates to compounds of the formula—

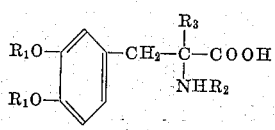

in which $R_1$ is lower alkanoyl or methyl, $R_2$ may be hydrogen or lower alkanoyl and $R_3$ is lower alkyl.

The compound α-methyl-β-3,4-dihydroxyphenylalanine, which is described in U.S. Patent No. 2,868,818, has been found to be useful in the treatment of hypertension. However, this compound is not readily absorbed into the blood stream when administered orally. Furthermore, the blood level of this compound reaches a maximum within a short time after the administration and thereafter falls rapidly. These factors necessitate a large dose, about 5–10 g. per day for most patients, administered at frequent intervals.

We have found that acylated derivatives of α-methyl-3,4-dihydroxyphenylalanine and its higher homologs are surprisingly more potent antihypertensive agents. The acylated compounds of our invention may be of two types, either the N,O,O-triacyl or the O,O-diacyl compounds.

It is an advantage of the compounds of our invention that their effect is more prolonged than that of the free acid. Oral administration of these acyl derivatives produces maximum blood levels several times greater than the maximum blood levels resulting from oral administration of an equal weight of the free hydroxyphenyl amino acid. Furthermore, the effects of the acyl derivatives are much longer lasting than those of the free amino acid and excretion of the free amino acid formed by hydrolysis of the acyl derivatives takes place much less rapidly than the excretion of the free amino acid.

The daily dosage of the acyl derivatives of our invention for human therapy is preferably 0.5 to 10 g. per day when administered orally. Due to the prolonged action of this compound, it may be administered as infrequently as twice a day, although more frequent dosages may be used if desired. The compounds are mixed with conventional tablet making ingredients and formed into tablets containing from about 0.25 to 2 g. of the active ingredient. The preferred dosage per day will run in the neighborhood of 2 to 5 g.

The acyl compounds of our invention are also extremely useful as intermediates in the separation of the stereoisomeric forms of D,L-α-methyl-β-(3,4-dihydroxyphenyl) alanine. The resolution of this compound into its optically active forms is best carried out by forming an acyl derivative, especially one having the amino acylated, and then resolving the isomers with an optically active base, such as phenyl ethyl amine or quinine which form crystalline diastereomeric salts of rather marked solubility differences.

The starting materials for the preparation of the compounds of our invention are the free hydroxyphenyl amino acids. α-Methyl-3,4-dihydroxyphenyl alanine is disclosed in U.S. Patent 2,868,818. Its higher homologs can be prepared by analogous procedures. For example, the following paragraphs describe the preparation of the α-ethyl homolog:

A solution of 88.5 g. (0.5 mole) of 3,4-dimethoxyphenylacetonitrile in 198 ml. of ethyl propionate is added to a freshly prepared solution of sodium ethoxide in ethanol prepared by dissolving 34.5 g. (1.5 moles) of sodium metal in 400 ml. of absolute ethanol containing 2% benzene. This solution is refluxed for four hours. The mixture is stirred while cooling in an ice bath for two hours. The precipitate is filtered and washed with 200 ml. of ethyl acetate and 200 ml. of ether. The resulting sodium salt of 1-(3,4-dimethoxyphenyl)-1-cyanobutanone-2 is dissolved in 1200 ml. of water and cooled in an ice bath to 10° C. To this solution is added 115 ml. of glacial acetic acid over a 30-minute period. The mixture is extracted with ether and the ether layer washed until neutral. The ether layer is dried and concentrated in vacuo to form propionyl(3,4-dimethoxyphenyl)acetonitrile as a viscous orange oil.

The 1-(3,4-dimethoxyphenyl)-1-cyanobutanone-2 weighing about 99 g. (0.425 mole) obtained above is added with stirring over a one-hour period to a solution of 250 ml. of concentrated (98%) sulfuric acid and 60 ml. of water at a temperature of 0 to 5° C. The mixture is heated at 80° C. for 10 minutes. The solution is cooled to 0° and 900 ml. of water is added slowly. The mixture is then heated on a steam bath at 90° C. for three hours. An oil separates upon cooling. This mixture is extracted with four 200 ml. portions and two 100 ml. portions of ether. The ether layers are combined and washed with 100 ml. of 5% aqueous solution of sodium bicarbonate and 100 ml. of water. The ether layer is dried and concentrated until liquid 1-(3,4-dimethoxyphenyl)-butanone-2 is obtained.

A reaction mixture of 40.0 g. (0.192 mole) of 1-(3,4-dimethoxyphenyl)-butanone-2, 150 g. of ammonium carbonate, 32.6 g. of potassium cyanide, 225 ml. of ethanol, and 225 ml. of water is stirred at room temperature for about 16 hours, heated to 55–60° C. for two hours and then concentrated in vacuo to one-half its original volume. The concentrated mixture is cooled to room temperature, filtered, and the precipitate of 5-ethyl-5-(3,4-dimethoxybenzyl)-hydantoin is washed with water and ether and then dried.

A mixture of 9.3 g. (0.33 mole) of 5-ethyl-5-(3,4-dimethoxybenzyl)-hydantoin, 46.5 g. of barium hydroxide, and 232 ml. of water is heated in a bomb with agitation at 150° C. for 14 hours. The bomb contents are cooled to room temperature and transferred to a flask. Carbon dioxide is bubbled into the reaction mixture until no more barium carbonate precipitates. The mixture is again filtered and the filtrate concentrated to dryness. The solid material, which has a weight of about 8.3 g. is suspended in 25 ml. of absolute ethanol, and the suspension is cooled and filtered. The solid D.L.-α-ethyl-β-(3,4-dimethoxyphenyl) alanine is washed with cold ethanol and ether and dried.

Fourteen grams (0.0553 mole) of D,L-α-ethyl-β-(3,4-dimethoxyphenyl)alanine is combined with 140 ml. of 48% aqueous hydrogen bromide and refluxed at 126° C. for 15 hours. The reaction mixture is concenetrated, and the solid residue is flushed twice with 100 ml. of tert.-butanol. The solid residue is dissolved in 140 ml. of water, neutralized to pH 6 with aqueous ammonium hydroxide solution and heated with 700 mg. of "Darco" decolorizing charcoal. The mixture is filtered and a small amount of sulfur dioxide is passed into the filtrate. The filtrate is concentrated in vacuo under a nitrogen atmosphere to a volume of about 40 ml. The mixture is cooled for about 16 hours, filtered and the precipitate washed with cold water followed by ether. The crystalline product α-ethyl-β-(3,4-dihydroxyphenyl)alanine is dried at 100° C. in vacuo.

The higher homologs are prepared analogously starting with an equivalent quantity of ethyl butyrate, ethyl valerate, and ethyl caproate in place of the ethyl propionate.

The two types of compounds of our invention are prepared in different manners. The completely acylated 3,4-dihydroxyphenylalanine derivatives are simpler to prepare. These compounds, the N,O,O-triacyl compounds, are prepared by heating the amino acid to 90–100° with a large excess of a lower alkanoic anhydride in the presence of an organic base. Reaction temperatures of 90–100° C. are preferred, although the reaction will take place even at room temperature, but at a much slower rate. Preferably, the base is used as a solvent. Alternatively, an inert solvent can be used, together with enough base to act as an acid-binding agent. The bases which may be used for this purpose include the preferred solvent, pyridine, as well as the picolines, dimethylaniline and the like. The lower alkanoic anhydrides which may be used include acetic anhydride, propionic anhydride, butyric anhydride and the like. In order to prepare formyl derivatives, it is necessary to use the mixed anhydride of formic acid and acetic acid which is described by Huffman, Journal of Organic Chemistry 23, 728 (1958). The product is isolated by evaporation of the solvent under reduced pressure and the excess base is removed by slurrying the residue in dilute acid. The product then can be filtered, washed and dried.

The diacyl compounds, the O,O-diacylphenylalanines, are prepared by a modified Schotten-Baumann reaction in dilute caustic, such as dilute sodium hydroxide, potassium hydroxide, barium hydroxide, and the like. The amino acid is dissolved therein and the solution is stirred vigorously while an excess of the anhydride is added gradually. The important point in preparing these compounds is that the caustic should so balance the amount of amino acid and potential acid from the anhydride that 85–100% of the acid will be neutralized. The aim is to end the reaction with a pH in the vicinity of 6–7. Under these conditions, the O,O-diacyl-3,4-dihydroxyphenylalanine compounds precipitate from the reaction mixture and can be isolated by filtration, washed and dried. The lower alkanoic anhydrides which may be used in this procedure are the same ones which may be used to prepare the triacyl derivatives described above.

Our invention can be illustrated by the following examples:

*Example 1*

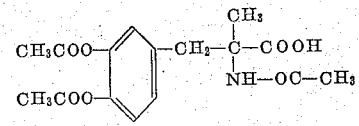

A mixture of 25 g. of α-methyl-β-3,4-dihydroxyphenylalanine, 100 ml. of acetic anhydride and 75 ml. of pyridine is purged thoroughly with nitrogen. It is then heated to 90° C. for two hours. The mixture is allowed to stand overnight at room temperature, after which it is concentrated on a steam bath in vacuo to a thick syrup. The residue is stirred with ice water and made strongly acidic with 2.5 N hydrochloric acid. The precipitated crystalline triacetate is isolated by filtration, washed thoroughly with ice water and dried over $P_2O_5$ in vacuo.

When acetyl chloride is used in equivalent amounts in place of the acetic anhydride, similar results are obtained.

*Example 2*

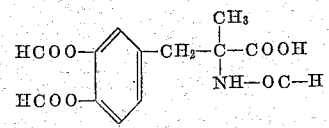

The procedure of Example 1 is followed using an equivalent quantity of the acetic-formic anhydride prepared as described by Huffman, J. Org. Chem. 23, 728 (1958). The triformyl compound of the above structure is obtained.

When an equivalent quantity of propionic anhydride or butyric anhydride is similarly substituted for the acetic anhydride, the corresponding tripropionyl and tributyryl compounds are obtained.

*Example 3*

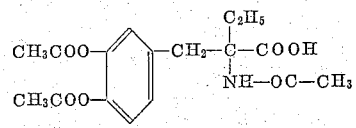

The procedure of Example 1 is followed substituting an equivalent quantity of α-ethyl-β-3,4-dihydroxyphenylalanine for the α-methyl compound to yield N,O,O-triacetyl-α-methyl-β-3,4-dihydroxyphenylalanine. When the corresponding α-propyl and α-butyl-3,4-dihydroxyphenyl alanines are substituted in equivalent quantities for the α-methyl compound, the corresponding triacetyl compounds are obtained.

*Example 4*

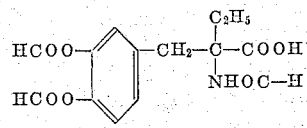

The procedure of Example 2 is followed using an equivalent quantity of α-ethyl-β-3,4-dihydroxyphenylalanine in place of the α-methyl compound to give the triformyl derivative of the α-ethyl compound. When propionic anhydride or butyric anhydride are substituted in equivalent quantities for the acetic anhydride, the corresponding tripropionyl and tributyryl products are obtained.

*Example 5*

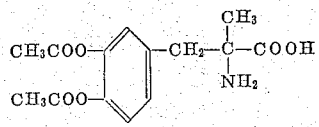

A mixture of 10 ml. of water and 5.73 g. (0.1432 mole) of sodium hydroxide is boiled and then cooled to room temperature. To the solvent is added 10 g. (0.0474 mole) of D,L-α-methyl-β-3,4-dihydroxyphenylalanine and 50 g. of ice and water. While stirring the solution vigorously, there is added 11.13 ml. (0.1183 mole) of acetic anhydride. The product precipitates in a very short time. The mixture is stirred at 0° for one hour and then filtered. The product is washed three times with 10 ml. portions of a 9:1 mixture of isopropyl alcohol and water. The wet product is then dissolved in a mixture of 100 ml. of isopropyl alcohol and 25 ml. of water held at the boiling point. The hot solution is filtered and the filtrate is allowed to cool. The crystalline product which forms is isolated by filtration, washed and dried. It is D,L-α-methyl-β-3,4-diacetoxyphenylalanine.

*Example 6*

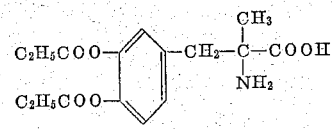

The procedure of Example 5 is followed using an equivalent quantity of propionic anhydride in place of the acetic anhydride, to yield α-methyl-β-(3,4 dipropionoxyphenyl)alanine.

Example 7

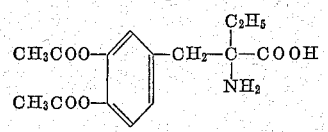

The procedure of Example 5 is followed using an equivalent quantity of α-ethyl-β-3,4-dihydroxyphenylalanine in place of the α-methyl compound. When, similarly, the α-propyl and α-butyl compounds are used, the corresponding diacetoxy derivatives are obtained.

Example 8

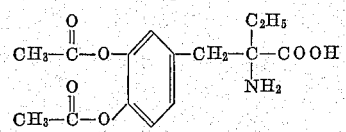

The procedure of Example 6 is followed using an equivalent quantity of α-ethyl-β-3,4-dihydroxyphenylalanine in place of the α-methyl compound. When equivalent quantities of propionic anhydride or butyric anhydride are used in place of the acetic anhydride, the corresponding dipropionyl and dibutyryl compounds are obtained.

Example 9

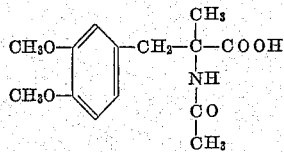

The procedure of Example 1 is followed using an equivalent quantity of α-methyl-β-(3,4-dimethoxyphenyl)-alanine in place of the α-methyl-β-(3,4-dihydroxyphenyl)-alanine. The product is the corresponding N-acetyl compound of the above structure.

We claim:

A process of preparing O,O-dialkanoyl derivatives of D,L-α-alkyl-β - 3,4 - dihydroxyphenylalanine which comprises agitating a solution of said alanine in a dilute aqueous basic solution while adding gradually an excess of a lower alkanoic anhydride, the amount of caustic present being such that it stoichiometrically balances at least 85% but not over 100% of the amount of potential acids used in the form of said anhydride, and isolating the separated dialkanoyl compound.

References Cited in the file of this patent

UNITED STATES PATENTS

| | | |
|---|---|---|
| 1,588,814 | Schulemann et al. | June 15, 1926 |
| 2,246,071 | Schussler et al. | June 17, 1941 |
| 2,349,774 | Toennies | May 23, 1944 |
| 2,445,642 | Soday | July 20, 1948 |
| 2,628,249 | Bruno | Feb. 10, 1953 |
| 2,868,818 | Pfister et al. | Jan. 13, 1959 |

OTHER REFERENCES

Wagner and Zook: Synthetic Organic Chemistry, John Wiley and Sons, Inc., New York, 1953, page 481–2.